US012735308B2

(12) United States Patent
O'Laughlin

(10) Patent No.: US 12,735,308 B2
(45) Date of Patent: Sep. 15, 2026

(54) CORKSCREW WITH CORK INTEGRITY PROTECTION APPARATUS

(71) Applicant: J. J. O'Laughlin, Chicago, IL (US)

(72) Inventor: J. J. O'Laughlin, Chicago, IL (US)

( * ) Notice: Subject to any disclaimer, the term of this patent is extended or adjusted under 35 U.S.C. 154(b) by 498 days.

(21) Appl. No.: 18/349,109

(22) Filed: Jul. 7, 2023

(65) Prior Publication Data

US 2024/0010481 A1 Jan. 11, 2024

Related U.S. Application Data

(60) Provisional application No. 63/359,185, filed on Jul. 7, 2022.

(51) Int. Cl.
*B67B 7/04* (2006.01)

(52) U.S. Cl.
CPC .... *B67B 7/0447* (2013.01); *B67B 2007/0458* (2013.01)

(58) Field of Classification Search
CPC ...................... B67B 7/0447; B67B 2007/0458
USPC ........................................................... 53/492
See application file for complete search history.

(56) References Cited

U.S. PATENT DOCUMENTS 5,367,923 A * 11/1994 Fabbro .................. B67B 7/0441 30/1.5
6,799,490 B1 10/2004 Chu
2019/0127195 A1 5/2019 Savatier et al.

FOREIGN PATENT DOCUMENTS

WO PCT/US2023/085832 5/2024

* cited by examiner

*Primary Examiner* — Veronica Martin
*Assistant Examiner* — Mary C Hibbert-Copeland
(74) *Attorney, Agent, or Firm* — Michael P. Mazza, LLC; Michael P. Mazza

(57) ABSTRACT

A corkscrew including a screw shaft and a pair of wings configured to lift the screw shaft when the pair of wings is compressed. The pair of wings are disposed opposite each other relative to the screw shaft. The corkscrew also includes a housing connected to the screw shaft, the housing having a first end configured to engage a container. The corkscrew also includes a pair of paddles connected to the housing and depending from the housing, past the first end.

7 Claims, 14 Drawing Sheets

CORKSCREW WITH CORK INTEGRITY PROTECTION APPARATUS

RELATED APPLICATIONS

This application claims priority to U.S. Provisional Patent Application 63/359,185, filed Jul. 7, 2022, the entirety of which is hereby incorporated by reference.

BACKGROUND

When opening a bottle of wine, some or all of a cork may fracture or break apart while a corkscrew is used to lift the cork from the opening of a wine bottle. When the cork breaks apart, the cork may become more difficult to extract fully from the bottle. Additionally, bits of cork undesirably may fall into the wine inside the bottle. Bits of cork in the wine may have a deleterious effect on the taste or enjoyment of the wine.

Additionally, it is common for the screw portion of a corkscrew to penetrate the bottom of the cork during the process of opening a corked bottle of wine. As a result, bits of cork undesirably may crumble and fall from the bottom of the cork into the wine within the bottle.

SUMMARY

The one or more embodiments provide for a corkscrew. The corkscrew also includes a screw shaft and a pair of wings configured to lift the screw shaft when the pair of wings is compressed. The pair of wings are disposed opposite each other relative to the screw shaft. The corkscrew also includes a housing connected to the screw shaft, the housing having a first end configured to engage a container. The corkscrew also includes a pair of paddles connected to the housing and depending from the housing, past the first end.

The one or more embodiments also provide for a method of opening a bottle stoppered with a cork. The method includes fitting a corkscrew to the bottle. The corkscrew includes a handle and a screw shaft connected to the handle. The corkscrew also includes a pair of wings configured to lift the screw shaft when the pair of wings is compressed. The pair of wings are disposed opposite each other relative to the screw shaft. The corkscrew also includes a housing connected to the screw shaft, the housing having a first end configured to engage a container. The corkscrew also includes a pair of paddles connected to the housing and depending from the housing, past the first end. The pair of paddles are connected to the housing in a manner to urge the pair of paddles radially inwardly when the pair of paddles are forced to move radially outwardly. The method also includes sliding the pair of paddles over a neck of the bottle. The method also includes screwing the screw shaft into the cork. The method also includes compressing the pair of wings to force the screw shaft and the cork partially from the bottle. The method also includes lifting the pair of wings until the pair of paddles slide a distance sufficient to permit the pair of paddles to grip the cork and to permit bottom ends of the pair of paddles to rest against a top of the bottle.

The one or more embodiments also provide for a method of manufacturing. The method includes connecting a handle to a screw shaft. The method also includes connecting a pair of wings to the screw shaft in an operable manner such that compression of the pair of wings causes the screw shaft to lift. The pair of wings are disposed opposite each other relative to the screw shaft. The method also includes connecting a housing to the screw shaft, the housing having a first end configured to engage a container. The method also includes connecting a pair of paddles to the housing. The pair of paddles depend from the housing, past the first end.

DETAILED DESCRIPTION

Figure 1:
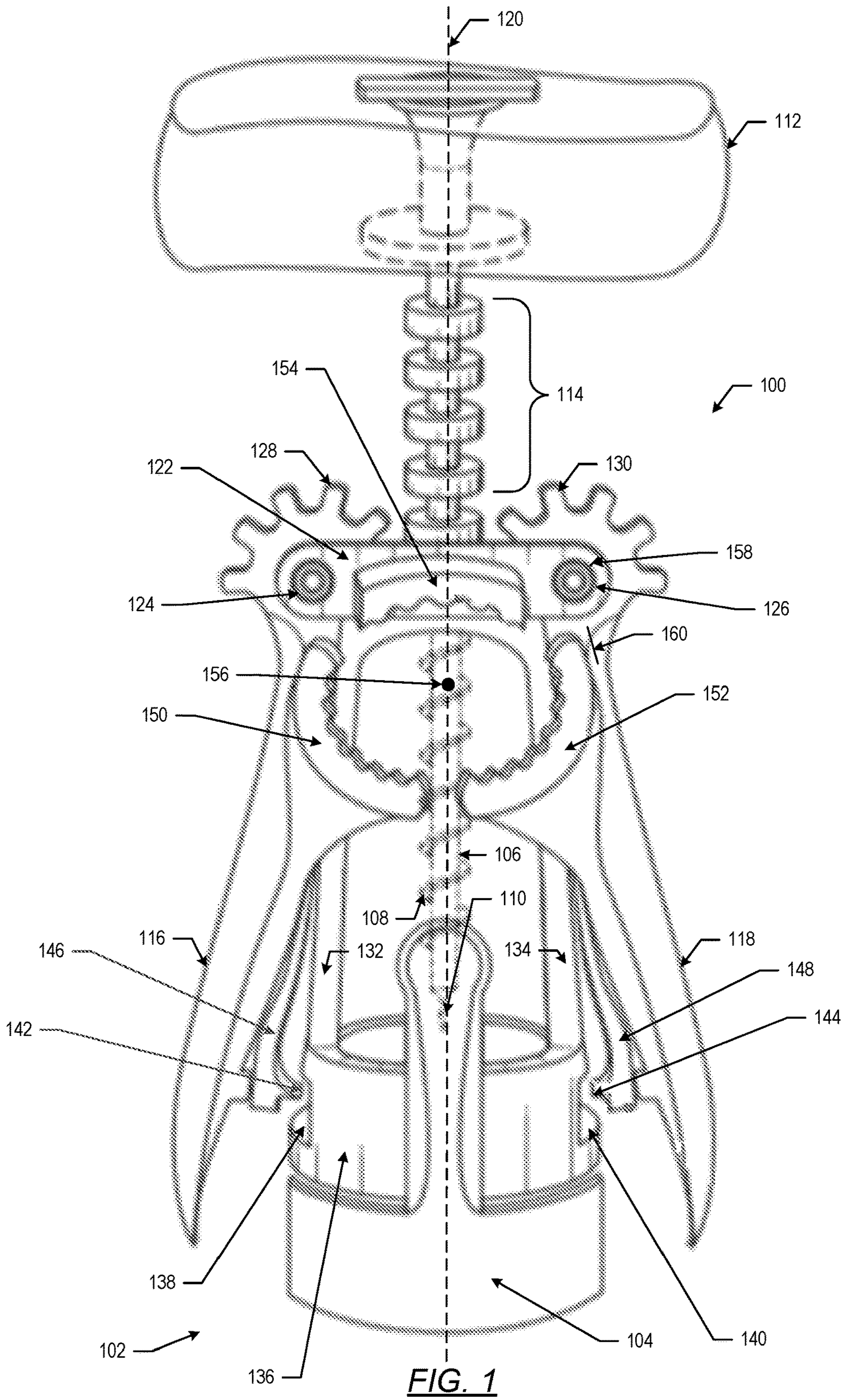
FIG. 1 shows an example of a corkscrew with a cork integrity protection apparatus, in accordance with one or more embodiments.

Specific embodiments will now be described in detail with reference to the accompanying figures. Like elements in the various figures are denoted by like reference numerals for consistency. In the following detailed description of embodiments, numerous specific details are set forth in order to provide a more thorough understanding. However, it will be apparent to one of ordinary skill in the art that the invention may be practiced without these specific details. In other instances, well-known features have not been described in detail to avoid unnecessarily complicating the description.

In several instances, the terms "first," "second," or other ordinal terms may be associated with the various components described herein. Such ordinal terms are nonce terms, used only to distinguish similar but distinct parts. "Similar but distinct" means that two or more components may have similar, symmetrical, or other common features, but which are yet deemed separate components. Ordinal terms are interchangeable (i.e., a "first paddle" could be considered a "second paddle" in some embodiments, and vice versa.) Ordinal terms also do not imply any structural differences among components, unless specifically described otherwise.

In general, the one or more embodiments are directed to a corkscrew with cork integrity protection apparatus. The corkscrew with cork integrity protection apparatus includes a handle and a screw shaft connected to the handle. The corkscrew also includes a pair of wings configured to lift the screw shaft when the pair of wings is compressed. The pair of wings are disposed opposite each other relative to the screw shaft. The corkscrew also includes a housing connected to the screw shaft, the housing having a first end configured to engage a container. The corkscrew also includes a pair of paddles connected to the housing and depending from the housing, past the first end. The pair of paddles are configured to be urged radially inwardly to grip the cork as the cork is lifted out of a bottle.

The pair of paddles may be radially offset 90 degrees around the screw shaft, relative to the pair of wings. A pair of foil cutters may be connected to the housing, wherein the pair of foil cutters that serve as a cutting edge that is compressible into slots disposed in the housing. The foil cutters may be used by compression of the wings; e.g., compression of the wings may force the foil cutters to engage against the foil surrounding the top of a wine bottle.

The foil cutter may be a modular component. Thus, for example, the blade of the foil cutter may be exchanged after becoming dull or less effective. In this case, the foil cutter may slip up into the housing and still be compressible by the wings.

The pair of paddles may have a paddle length along a longitudinal axis of the screw shaft. The paddle length is sized and dimensioned such that the pair of paddles will engage against the cork as the cork lifts from the wine bottle. As a result, the paddles provide additional controlled leverage when lifting the cork in a linear fashion. Accordingly, the cork is protected and less likely to crumble during a lift operation.

Attention is now turned to the various Figures. In particular, FIG. 1 shows an example of a corkscrew (100), in accordance with the one or more embodiments. The corkscrew (100) may be referred-to as a "CorkLift" in some embodiments.

The corkscrew (100) includes a cork integrity protection apparatus (102). As described further below, the cork integrity protection apparatus (102) includes a pair of opposing paddles. In FIG. 1, a first paddle (104) of the pair of opposing paddles is shown. The cork integrity protection apparatus (102) is described further below.

The corkscrew (100) includes a screw shaft (106). The screw shaft (106) is a straight length of metal, plastic, or other material suitable for penetrating a cork, such as the cork of a wine bottle.

The screw shaft (106) may include one or more features. For example, the screw shaft (106) may include a helical ridge (108) disposed over an outer surface of the screw shaft (106). The helical ridge (108) may be attached to or integrally formed with the screw shaft (106). The helical ridge (108) may help the screw shaft (106) form a gripping relationship with a cork when the screw shaft (106) is forced into the cork.

Another feature of the screw shaft (106) may be a trocar (110), disposed at a distal end of the screw shaft (106). The term "distal," in the one or more embodiments, refers to a direction oriented towards a cork when the corkscrew (100) is in use to remove a cork from a bottle. The term "proximal," in the one or more embodiments, refers to a direction oriented towards a handle (112) of the corkscrew (100).

The trocar (110) may have a variety of shapes and sizes, but is sized and dimensioned to aid in penetrating a cork when the corkscrew (100) is used. For example, the trocar (110) may be a pointed edge having a trocar diameter smaller than a shaft diameter of the screw shaft (106). The trocar (110) may be sized and dimensioned to extend a distance (e.g., 2 mm) below a collar (136) to pierce the foil a short distance. In this manner, the trocar (110) may be kept centered more easily and further may be more stable during the early stages of penetration of the trocar (110) and the screw shaft (106) into the cork (202) (see FIG. 2).

The handle (112) is disposed at the proximal end of the screw shaft (106). The handle (112) may be sized and dimensioned to fit into a human hand. The handle (112) may be shaped to ergonomically fit a human hand, with the term "ergonomically shaped" determinable by an engineer. In any case, the handle (112) may be fixedly connected to the screw shaft (106). However, in some embodiments, the handle (112) may be removably attached to the screw shaft (106) so that different handles may be attached by a user. In any case, turning the handle (112) also turns the screw shaft (106).

In an embodiment, the handle may be a ratchet handle. The ratchet handle may be a T-handle or may have a variety of other shapes and styles, such as round handles, oval handles, etc. The ratchet handle allows for a steadier hand and eliminates or reduces the need to regrip the handle after every half turn, resulting in a more centered helix entry into the cork, while reducing micro torque and risk of cork fracture.

Another feature of the screw shaft (106) may be gear steps (114). The gear steps (114) facilitate advancement of the screw shaft (106) into a cork as the handle (112) is twisted, as described below. In particular, when the screw shaft (106) is advanced into the cork, the screw shaft (106) forces the mouth of the bottle into the base of the corkscrew housing. This action results in the first wing (116) and the second wing (118) rising up proportionally to the advancement of the screw shaft (106) into the body of the cork.

Note that the screw shaft (106) may not move relative to the housing. When the screw shaft (106) is advanced into the cork, the mouth of the bottle is forced into the base of the corkscrew housing. As a result, the wings rise up proportionally to the advancement of the screw shaft (106) into the body of the cork.

In particular, the corkscrew (100) also may be equipped with a pair of wings, including a first wing (116) and a second wing (118). The pair of wings may be symmetrically disposed opposite each other, relative to a longitudinal axis (120) of the screw shaft (106). The pair of wings alternatively may be more simply described as being disposed opposite each other relative to the screw shaft.

Each of the first wing (116) and the second wing (118) are rotatably connected to a cross-brace (122) through which the screw shaft (106) is disposed. Rotatable connection may be achieved using first bearing (124) for the first wing (116) and a second bearing (126) for the second wing (118). However, other mechanisms may be used to rotatably connect the pair of wings to the cross-brace (122).

Each of the pair of wings may include gear teeth disposed at proximal ends of the wings. Thus, for example, the first wing (116) includes first gear teeth (128) and the second wing (118) includes second gear teeth (130). The gear teeth of the pair of wings is in an operative engagement with the gear steps (114) of the screw shaft (106). Thus, when the pair of wings is lifted, the first gear teeth (128) and the second gear teeth (130) engage with the gear steps (114), thereby forcing the screw shaft (106) in a distal direction (e.g., towards a cork). Similarly, when the handle (112) is twisted, the gear steps (114) engage the first gear teeth (128) and the second gear teeth (130), thereby both forcing the first wing (116) and the second wing (118) upwardly (i.e., in a proximal direction) while concurrently forcing the gear steps (114) downwardly (i.e., in a distal direction). In this manner, the pair of wings is configured to lift the screw shaft (106) when the pair of wings is compressed.

The corkscrew (100) also may include a pair of braces, including a first brace (132) and a second brace (134). The first brace (132) and the second brace (134) are connected to the cross-brace (122). The first brace (132) and the second brace (134) are also connected to a collar (136) disposed towards a distal end of the corkscrew (100). The collar (136) is hollow, and is sized and dimensioned to receive a cork, such as but not limited to a wine bottle cork.

A pair of slots, such as a first slot (138) and a second slot (140) may be disposed in the collar (136). The pair of slots are openings in the collar (136). The first slot (138) and the second slot (140) may be disposed opposite each other, relative to the longitudinal axis (120), and in particular may also face the pair of wings. Thus, the first slot (138) faces the first wing (116), and the second slot (140) faces the second wing (118).

Together, the cross-brace (122), the first brace (132), the second brace (134), and the collar (136) may be characterized as a housing. A distal end of the housing may be a referred to as a “first end of the housing.” The screw shaft (106) is connected to the housing by means of the pair of gear teeth engaging the gear steps (114). The first end of the housing is configured to engage a container, such as but not limited to a wine bottle, a spirits bottle, etc. The term “configured to engage” means that the collar (136) is sized and dimensioned to fit over a cork, and that a bottom (i.e. distal) end of the housing may rest against a bottle lip (for bottles with bottle lips).

Attention is now turned to the cork integrity protection apparatus (102). Again, the cork integrity protection apparatus (102) includes a pair of paddles, of which the first paddle (104) is shown in FIG. 1. See FIG. 7 and FIG. 8 for a view which shows both of the pair of paddles. The pair of paddles (including the first paddle (104)) depends from and is connected to the housing and extends past the first end of the collar (136). The pair of paddles may be radially offset degrees around the screw shaft, relative to the pair of wings. However, in other embodiments, the pair of paddles may have different positional relationships relative to the pair of wings. As shown in FIG. 1, the pair of paddles may be sized and dimensioned to fit between the housing and a top of a bottle during a cork removal operation.

Specifically, in an embodiment, the pair of paddles may be rotatably connected to the collar (136). The rotatable connection may include a spring which urges the pair of paddles inwardly towards the longitudinal axis (120) of the corkscrew (100). The rotatable connection may also be accomplished by means of a memory material (some metals, composite materials, etc.) that retains its shape. For example, when the paddle is pushed radially outwardly (along the transverse axis (156), described below), the paddle will be urged back towards the radially inward direction. Thus, the pair of paddles are connected to the housing in a manner to urge the pair of paddles radially inwardly when the pair of paddles are forced to move radially outwardly.

In use, as explained further below, the pair of paddles initially grip the bottle. However, as the screw shaft (106) of the corkscrew (100) advances into the cork, the pair of wings (116, 118) rise up. Compressing the pair of wings (116, 118) in a downward direction drives the screw shaft (106) and the cork partially away from the bottle opening along the longitudinal axis (120). Lifting the wings upwardly again raises the housing and slides the attached pair of paddles up the mouth of the wine bottle, until the pair of paddles clears the lip of the bottle. When the housing has been lifted a distance about greater than a length of the pair of paddles along the longitudinal axis (120), the spring will urge the pair of paddles to slide onto the exposed cork and grip the cork. Concurrently, the distal ends (i.e., the bottoms) of the pair of paddles will be disposed on (e.g. sit) on top of the lip of the bottle. In this manner, as described further below, the bottoms of the pair of paddles will serve as a foundation that pushes against the lip of the bottle during a final CorkLift operation.

The corkscrew (100) also may include other features. For example, in an embodiment, the corkscrew (100) may be provided with a pair of foil cutters, shown as first foil cutter (142) and second foil cutter (144). The pair of foil cutters may be disposed under the pair of wings. Thus, the first foil cutter (142) may be disposed under the first wing (116), and the second foil cutter (144) may be disposed under the second wing (118).

The pair of foil cutters may be connected to a pair of flexible members, namely first flexible member (146) and second flexible member (148). The flexible members may be metal or some other memory material which tends to spring back to an original shape after having been pushed inwardly towards the slots in the collar (136). Alternatively, the pair of flexible members may be connected to springs or other rotatable mechanisms which urge the pair of foil cutters some distance away from a pair of slots in the collar (136).

In use, a user places the collar (136) over a foil covering a wine bottle and places the pair of slots about where the user wishes to cut the foil. The user then pushes in on the pair of wings, which in turn urges the pair of foil cutters into the pair of slots in the collar (136) and thereby penetrates the foil covering the top of the wine bottle. The user may then rotate the housing of the corkscrew (100), which thereby forces the cutting edge of the pair of foil cutters through the foil, cutting the foil. Alternatively, the user may rotate the bottle inside the stationary collar.

The corkscrew (100) may be provided with still other features. For example, the corkscrew (100) may be provided with gripping ridges, including a first gripping ridge (150), a second gripping ridge (152), and a third gripping ridge (154). The first gripping ridge (150) is connected to the first wing (116). The second gripping ridge (152) is connected to the second wing (118). The third gripping ridge (154) is connected to the cross-brace (122). Together, the three gripping ridges may be symmetrically disposed around a transverse axis (156) which is perpendicular to the longitudinal axis (120) and which comes out of the page of FIG. 1 at a location in about a middle portion of the three gripping ridges.

The gripping ridges may be referred-to as a “Twist-Assist.” The Twist-Assist feature may take different forms, such as serrated jaws or other bottle top gripping apparatus built into the wing handles and/or the housing. The twist assist may also take the form of clamps or other features that can be used to grip the cap of a bottle.

In use, a user may tilt the corkscrew (100) over the top or lid of a bottle, jar, or can. The pair of wings may be lifted into a position where, together, the three gripping ridges are disposed around the top or lid. The user may then squeeze the pair of wings, and then grip the top or lid with the gripping ridges. The user then may twist the corkscrew (100), thereby opening the top or lid. Thus, the corkscrew (100) also may be used as a bottle, jar, or can opener.

The corkscrew (100) may be provided with still additional features. For example, the corkscrew (100) may include depth penetration markers, including at least one static marker (158) and at least one mobile marker (160). The static marker (158) is a line drawn, engraved, etc. at a pre-determined location on the cross-brace (122) (i.e., at a predetermined angle, and located at pre-determined longitudinal and transverse distances relative to the longitudinal axis (120) and the transverse axis (156)). The mobile marker (160) is drawn, engraved, etc. at a predetermined location on the second wing (118), as shown in FIG. 1. However, similar mobile and static marks may be drawn on the opposite side of the cross-brace (122) and on the first wing (116). The opposing static and mobile markers may be mirror images of each other, as the opposing static and mobile markers are on opposite sides of the longitudinal axis (120).

Figure 3:
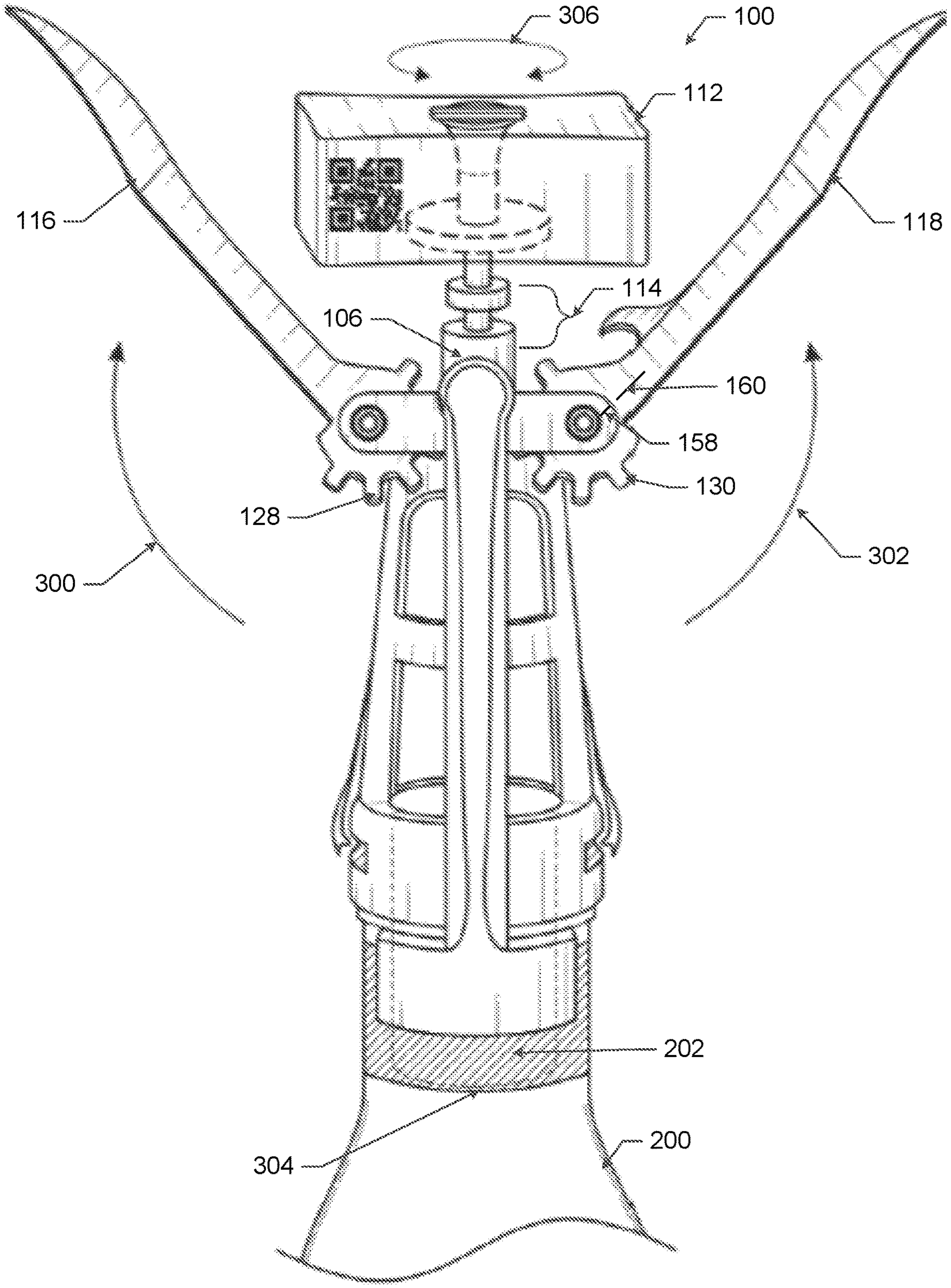

In use, when the static and mobile markers are aligned along a single line, as shown in FIG. 3, then a depth that the trocar (110) and the screw shaft (106) have penetrated the cork (i.e., a length the trocar (110) and the screw shaft (106) have moved past an end of the collar (136)) has reached a pre-determined penetration depth. In this manner, a user may know to stop driving the trocar (110) into the cork, and thereby avoid the trocar (110) from penetrating through a bottom portion of the cork. Thus, the static marker (158) and the mobile marker (160) may be used to prevent bits of cork from falling into the wine or other beverage prior to drinking the beverage.

In an embodiment, multiple static and mobile markers maybe disposed radially about the cross-brace (122), such as around the first bearing (124) or the second bearing (126), and along different radial angles on the first wing (116) or the second wing (118). Thus, the corkscrew (100) may provide a means for a user to gauge different penetration depths of the trocar (110) and the screw shaft (106) when the corkscrew (100) is in use.

FIG. 2, FIG. 3, FIG. 4, FIG. 5, and FIG. 6 show another example of a corkscrew with a cork integrity protection apparatus, in use, in accordance with one or more embodiments. Thus, FIG. 2 through FIG. 6 use common reference numerals that refer to common objects having common descriptions.

Figure 2:
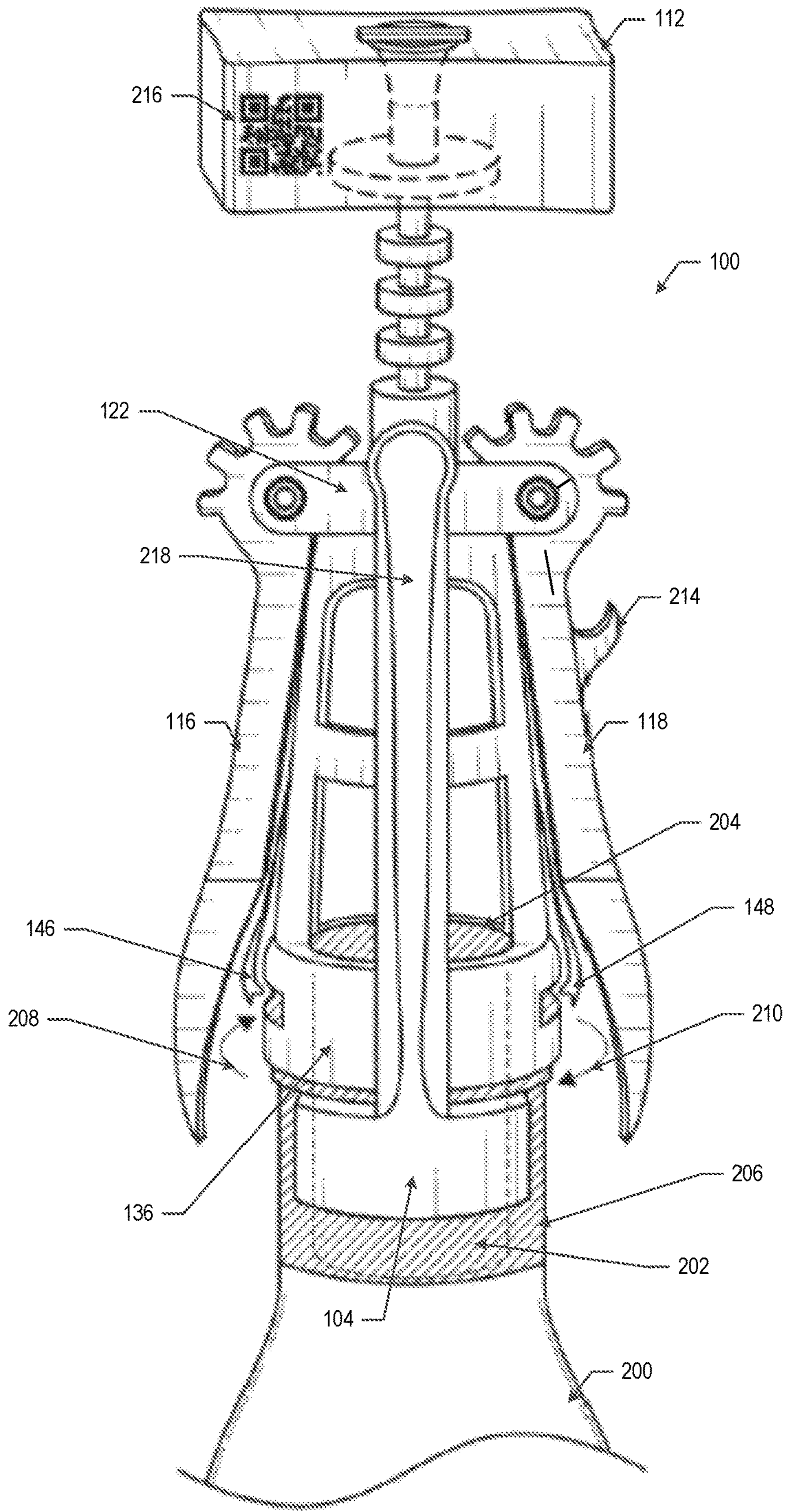
FIG. 2, FIG. 3, FIG. 4, FIG. 5, and FIG. 6 show another example of a corkscrew with a cork integrity protection apparatus, in use, in accordance with one or more embodiments.

FIG. 2 shows the corkscrew (100) in use. The corkscrew (100) has been placed over a bottle (200) which includes a cork (202) disposed inside an opening (204) of the bottle (200). A sheet of foil (206) is disposed over the top of the bottle (200). In summary, FIG. 2 shows placing the corkscrew (100) over the bottle (200), squeezing the pair of wings, engaging the pair of foil cutters, and twisting the bottle (200) or the corkscrew (100) to cut the foil (206).

In the example of FIG. 2, the collar (136) has been placed over the top of the bottle (200) such that the top of the bottle (200) fits into the space defined inside the collar (136). Accordingly, the pair of paddles, including the first paddle (104) shown in FIG. 2, have been urged outwardly by pressing the proximal end of the paddle. As shown, the pair of paddles is disposed beneath the collar (136), and grip the top of the bottle (200). However, the grip is, in this embodiment, not so tight as to prevent rotation of the collar (136) around the top of the bottle (200).

In use, the user presses the pair of wings (i.e., the first wing (116) and the second wing (118)) inwardly towards the top of the bottle (200). As a result, the pair of foil cutters (i.e., the first flexible member (146) and the second flexible member (148)) penetrate the foil (206). The user then twists the corkscrew (100), as shown by the arrow (208) and the arrow (210), while still squeezing the first wing (116) and the second wing (118). As a result, the foil (206) is cut around the circumference of the bottle (200). Note, however, that the user could twist the corkscrew (100) in a direction opposite to that shown by the arrow (208) and the arrow (210), or could hold the engaged foil cutters stationary and twist the bottle in either direction.

FIG. 2 also shows that the corkscrew (100) may still have additional features, other than those shown in FIG. 1. In particular, the corkscrew (100) may be provided with a bottle opener (214). The bottle opener (214) is attached to the second wing (118) in FIG. 2, but may be attached to either wing, or to some other part of the corkscrew (100). The bottle opener (214) is suitable for opening bottles having pressed tops that may be pried loose from the top of the bottle. In some examples the bottle opener (214) may not be suitable for opening wine bottles with corks, as shown in FIG. 2, but may be useful for opening other types of bottles.

Another feature shown in FIG. 2 is a quick response code (i.e., quick response (QR) code (216)), printed or engraved on the handle (112) or other part of the corkscrew (100). A user may scan the QR code (216), such as with a smart phone or some other scanner, and thereby obtain information. The information may be instructions for using the corkscrew (100), marketing information for beverages or the corkscrew (100), or other useful information, such as different beverages and their uses in cooking, entertaining, drinking, etc.

Another feature shown in FIG. 2, different than in FIG. 1, is that the first paddle (104) is connected to the cross-brace (122), instead of to another part of the housing, as shown in FIG. 1. In particular, a pair of arms, such as first arm (218) shown in FIG. 2, may connect the cross-brace (122) to the first paddle (104). The first arm (218) may be connected to the cross-brace (122) via a spring or some other rotatable component which permits the first paddle (104) to move radially outwardly from the corkscrew (100) (and thereby accommodate the outer diameter of the bottle (200)), but to urge the first paddle (104) radially inwardly (in order to grip the bottle (200)). Alternatively, the first arm (218) may be a memory material, such as metal, plastic, composite, etc., which is flexible enough to bend outwardly as the first paddle (104) moves over the outer diameter of the bottle (200), but which attempts to retain its original shape. In this manner, the first paddle (104) is still urged radially inwardly in order to grip the bottle (200), as described above.

FIG. 3 shows another stage in a CorkLift operation using the corkscrew (100). In summary, FIG. 3 shows driving the helix (i.e., the helical ridge (108) shown in FIG. 1) into the cork (202) by twisting the handle (112) (e.g., clockwise). Additionally, the pair of wings are raised until alignment of the static marker (158) and the mobile marker (160).

Specifically, the user twists the screw shaft (106) while pushing on the handle (112) to advance the trocar and helix into the cork, consequently raising the pair of wings (i.e., the first wing (116) and the second wing (118)), as shown by arrow (300) and arrow (302). Clockwise advancement of the helix into the cork, coupled with the raising of the pair of wings, causes the first gear teeth (128) and the second gear teeth (130) to engage the gear steps (114). As a result, the screw shaft (106) moves downwardly. Accordingly, the trocar (not shown in FIG. 3) may penetrate the cork (202).

The depth of penetration of the trocar (110) and the helix of the screw shaft (106) into the cork (202) may be controlled by use of the static marker (158) and the mobile marker (160). In particular, the user may stop raising the pair of wings when the static marker (158) and the mobile marker (160) are aligned along a same line, as shown in FIG. 3. Because many corks have a similar length, the markers may be used to control the depth of penetration of the trocar to a distance such that the trocar does not penetrate a bottom (304) of the cork (202).

After the trocar has been desirably positioned with in the cork (202), the user then twists the handle (112), as shown by arrows (306). The user may twist the handle (112) in a direction (e.g., counter-clockwise) which will draw the screw shaft (106) proximally (i.e., away from the bottle (200)).

Figure 4:
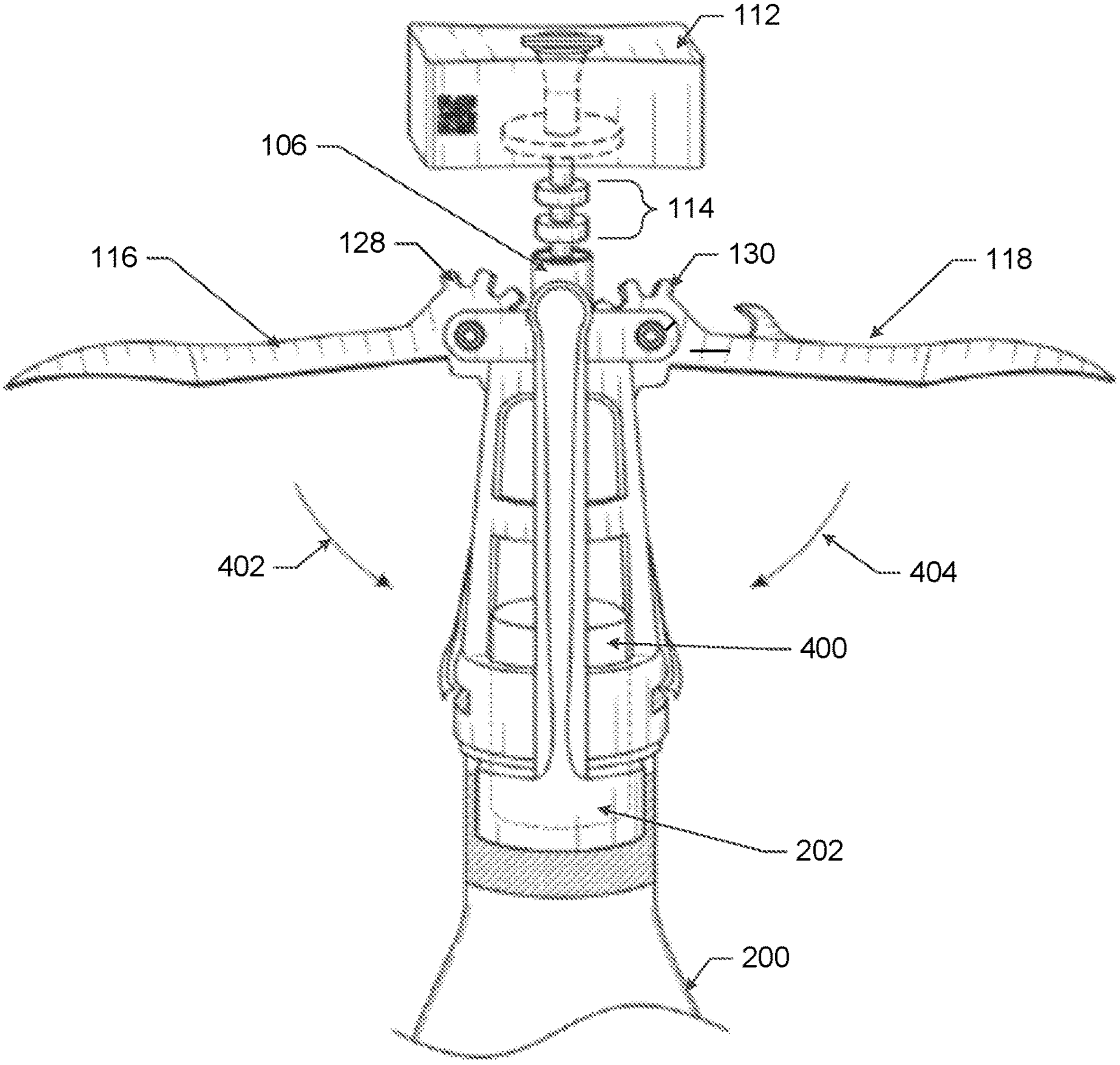

Thus, as shown in FIG. 4, because the screw shaft (106) is embedded in the cork (202), compressing the pair of wings downwardly forces the cork (202) upwardly (i.e., proximally) through the collar and away from the bottle (200). Accordingly, FIG. 4 shows a top (400) of the cork (202) exposed outside of the bottle (200).

In summary, compressing the wings downward delivers the cork (202) partially out of the bottle (200). However, FIG. 4 shows that the pair of wings are only partially compressed in order to show that an initial CorkLift operation is in mid-action. The full action (which still only partially lifts the cork out of the bottle) would show the pair wings nearer the longitudinal axis (i.e., the longitudinal axis (120) shown in FIG. 1), and the cork (202) would be more exposed (see FIG. 6, for example).

Figure 5:
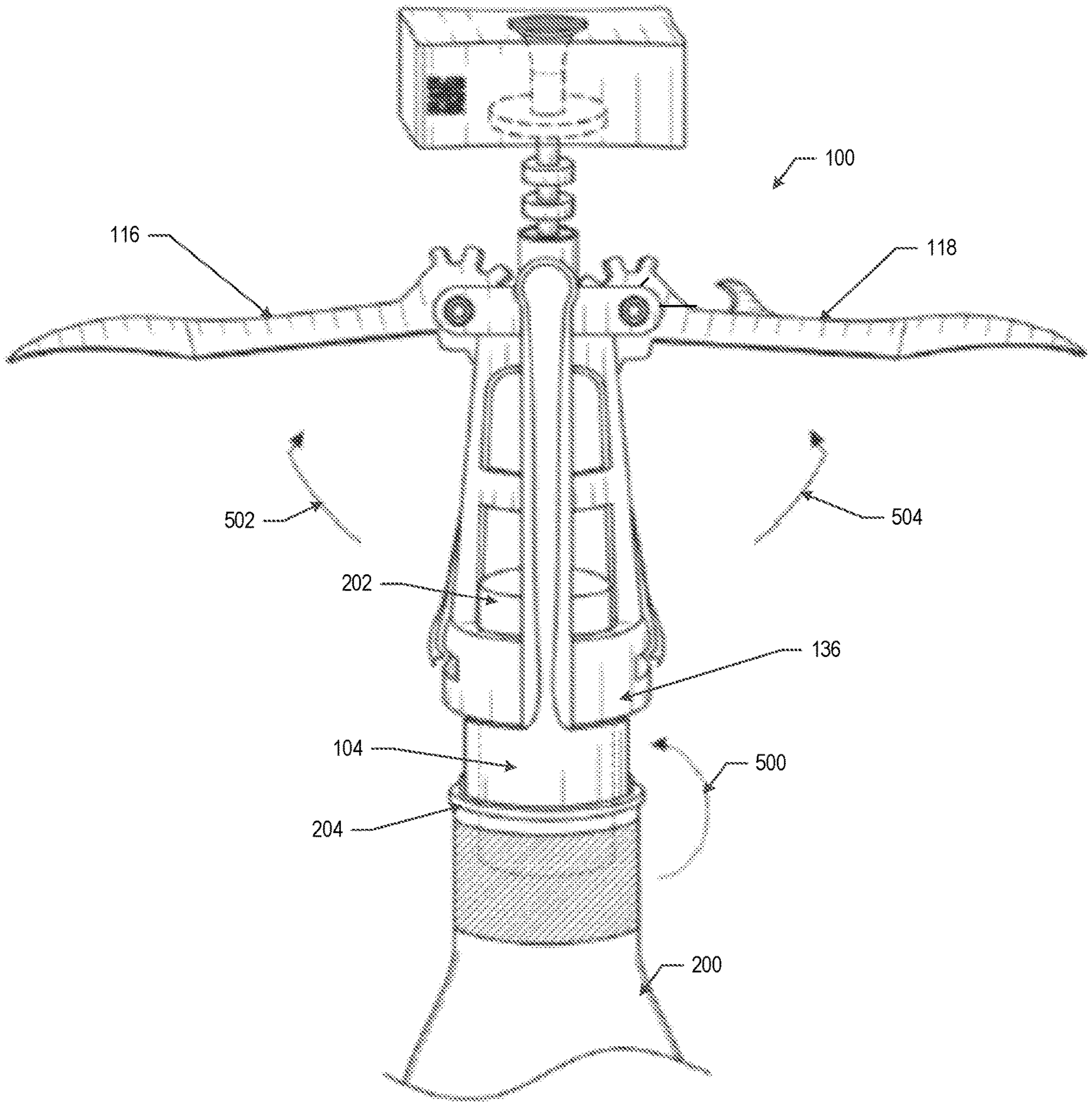

FIG. 5 shows the pair of wings being raised, which in turn proximally lifts the housing and particularly the collar (136) from the top of the bottle (200). Consequently, the pair of paddles slide up the neck of the bottle (200). Note that during this step the cork (202), the helical ridge (108), and the screw shaft (106) (see FIG. 1) are all stationary. Thus, the housing is being repositioned, but the cork (202) is not moving during this step.

Accordingly, FIG. 5 shows the position of the pair of paddles and an example position of the pair of wings after repositioning the housing. The pair of paddles have slid up above the lip of the bottle and have snapped into place up against the exposed portion of the cork. Concurrently, the distal ends (i.e., the bottoms) of the pair of paddles now rest on or are proximate to the lip or rim of the bottle (200). The arrow (500) shown in FIG. 5 represents the paddles sliding up the bottle and into position. After the operation shown in FIG. 5, the corkscrew (100) is in position and ready for the second press which lifts the cork out of the bottle (see FIG. 6).

In addition, FIG. 5 shows the concurrent raising of the first wing (116) and the second wing (118), as indicated by arrow (502) and arrow (504), after the initial partial extraction of the cork (202). As the wings raise, the paddles (including first paddle (104)) slide proximally and clear the opening (204) of the bottle (200), as indicated by the arrow (500). The paddles then snap into place up against the cork (202). The cork (202) is thereby reinforced for the final portion of the cork removal operation, in which the cork (202) is completely removed from the bottle (200) by compressing the wings a second time (see FIG. 6).

As mentioned above, FIG. 5 shows a useful aspect of the corkscrew (100). Because the pair of paddles snap up against the exposed cork (202), the bottoms of the pair of paddles may form a contact with the top of the opening (204) of the bottle (200). In this manner, the pair of paddles may act as a buttress and a reset of a functional foundation between the corkscrew (100) and the bottle (200) during the secondary (and likely final) cork extraction process.

For example, when the pair of wings are pressed downwardly again (see FIG. 6), the bottoms of the pairs of paddles may push against the lip of the opening (204) of the bottle (200). The screw shaft (106) is then lifted upwardly together with the cork (202). As a result, unintended sheer forces may be taken off of the cork (202), and accordingly the cork is more likely to maintain structural integrity.

In addition, as indicated above, the pair of paddles (including the first paddle (104)) are configured to be urged radially inwardly after having been pushed radially outwardly by the act of placing the pair of paddles on the bottle (200). However, once the cork (202) has been sufficiently lifted past the opening (204) of the bottle (200), the pair of paddles (including the first paddle (104)) are urged inwardly until the pair of paddles grips the cork (202). The term "sufficiently lifted" means that an amount of lifting has occurred such that a length of the cork (202) between the collar (136) and the opening (204) is greater than or about equal to a longitudinal length of the first paddle (104). Thus, the cork (202) is gripped between the pair of paddles, thereby helping to prevent the cork (202) from disintegrating, and further helping the cork (202) maintain structural integrity as the cork (202) is lifted out of the bottle (200). Thus, the corkscrew (100) helps to ensure that bits of the cork (202) do not fall into the bottle (200) and hence degrade enjoyment of the beverage contained therein.

Figure 6:
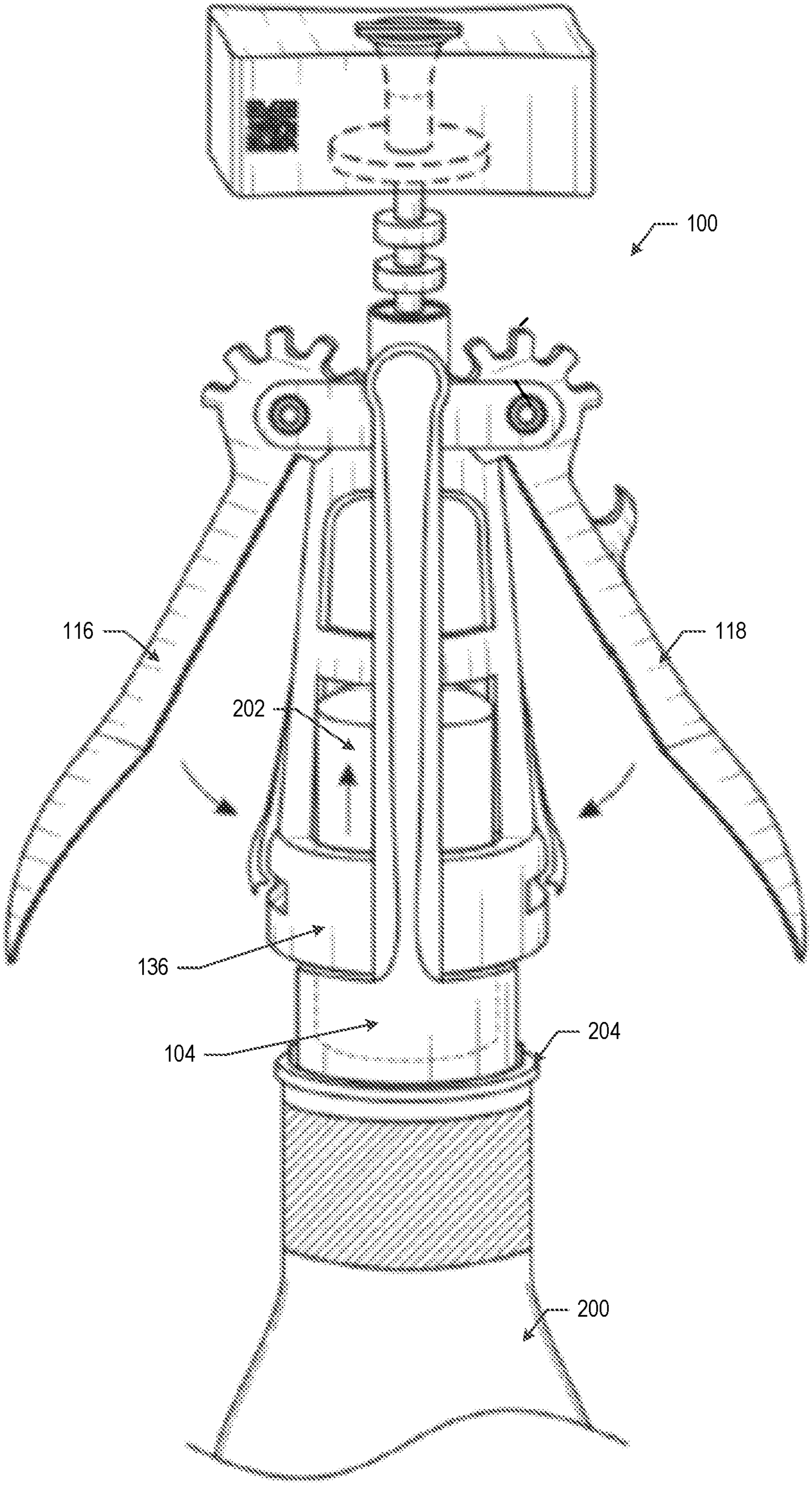

FIG. 6 shows another step to remove the cork (202) from the bottle (200). The user may further depress or squeeze the wings (i.e., the first wing (116) and the second wing (118)) a second time in order to complete the lifting of the cork (202) from the bottle (200). The effect of depressing or squeezing the wings, together with the effect of the pair of paddles resting against the top of the bottle (200), is described above with respect to FIG. 4 and FIG. 5. Thereafter, the cork (202) may be removed from the corkscrew (100), and may be saved or recycled.

Figure 7:
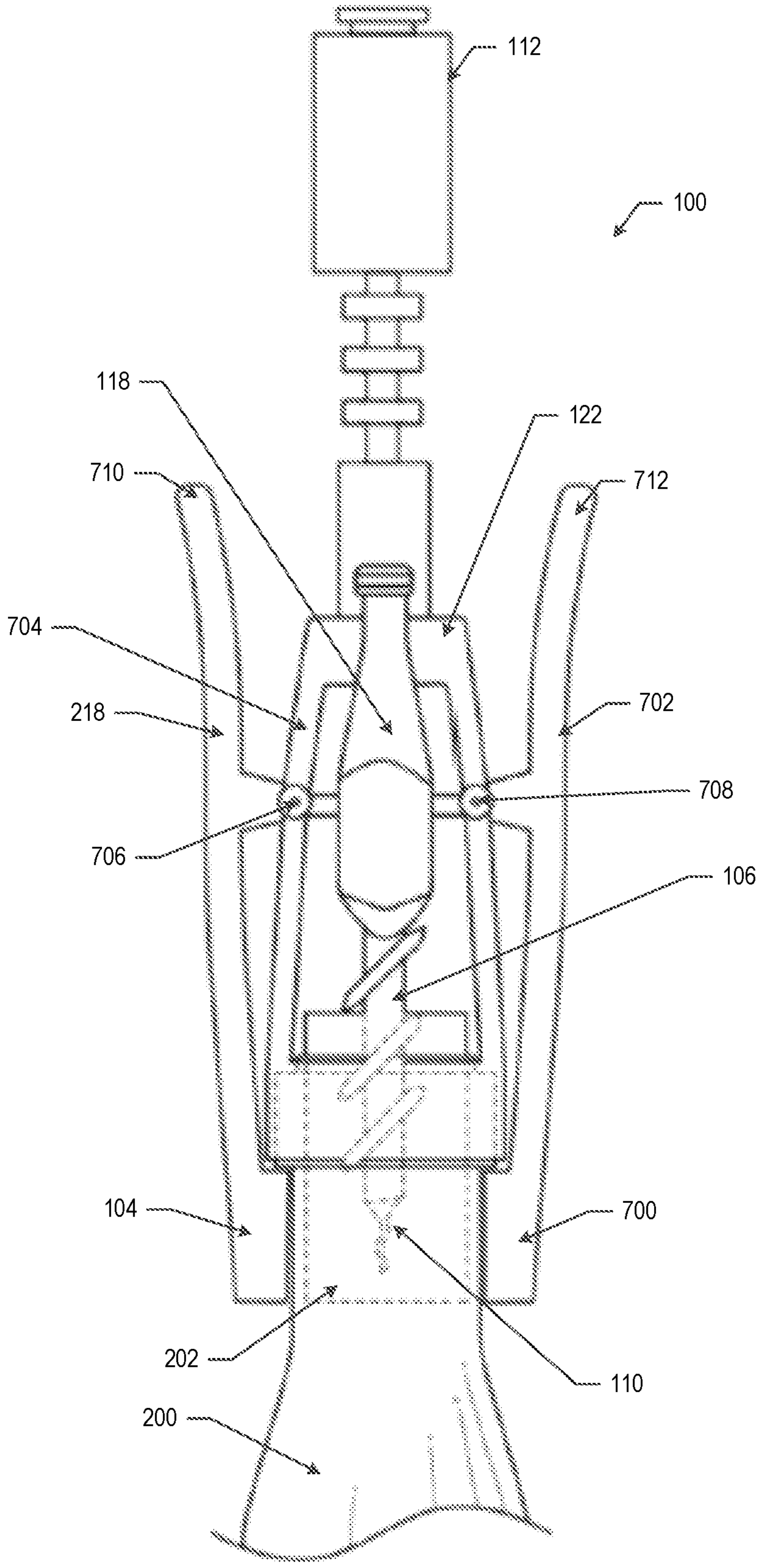
FIG. 7, FIG. 8, and FIG. 9, show another example of a corkscrew with a cork integrity protection apparatus, in use, in accordance with one or more embodiments.
Figure 8:
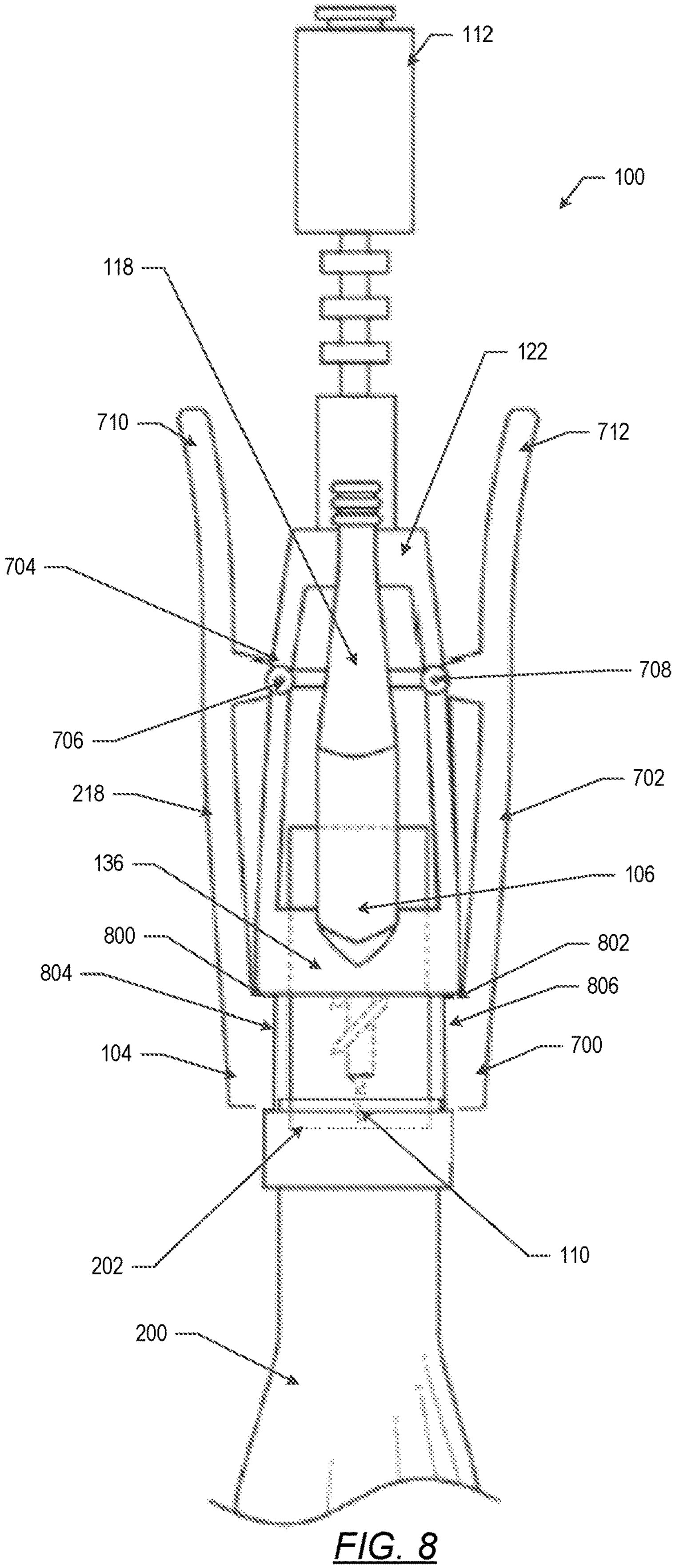

FIG. 7 and FIG. 8 shows a side-view of the corkscrew (100) shown in FIG. 1 through FIG. 6. The handle (112), the screw shaft (106), the cross-brace (122), the collar (136), the trocar (110), the bottle (200), and the cork (202) are shown for reference. Note that the trocar (110) does not penetrate a bottom of the cork (202). One of the pair of wings, the second wing (118) (or the first wing (116) in another embodiment) is also shown for reference.

FIG. 7 and FIG. 8 show the pair of paddles more fully. Thus, FIG. 7 and FIG. 8 show both the first paddle (104) and a second paddle (700) of the pair of paddles. Likewise the first arm (218) and the second arm (702) are shown.

The first arm (218) and the second arm (702), together, may be referred-to as a pair of arms. In the embodiment shown, the first arm (218) is connected to the housing (704) via a first torsional spring (706). Similarly, the second paddle (700) is connected to the housing (704) via a second torsional spring (708). The torsional springs are configured to urge the first arm (218) and the second arm (702), and hence the first paddle (104) and the second paddle (700), radially inwardly (i.e., towards the screw shaft (106)).

In use, a user may depress the first arm (218) and/or the second arm (702) in order to release a grip of the pair of paddles on the cork (202) or on the bottle (200). Extended handles, such as the first extended handle (710) of the first arm (218) or the second extended handle (712) of the second arm (702), may be present. The first extended handle (710) and the second extended handle (712), together, may be referred to as a pair of extended handles. The pair of extended handles (taken individually or together) allow a user to apply greater torque to the pair of arms, thereby making it easier to move the first paddle (104) and the second paddle (700) radially outwardly in order to aid in releasing the cork (202) or the bottle (200) from the corkscrew (100).

FIG. 8 further shows how the pair of paddles (i.e., the first paddle (104) and the second paddle (700)) grip the cork (202) once the cork (202) has been sufficiently lifted out of the bottle (200). Flanged edges of the pair of paddles (i.e., a first flanged edge (800) of the first paddle (104) and a second flanged edge (802) of the second paddle (700)) may be present in some embodiments.

The flanged edges may be sized and dimensioned to fit under a bottom of the collar (136) to a pre-determined radially inward distance. The radially inward distance established for the first flanged edge (800) and the second flanged edge (802) may be selected such that extended portions of the paddles (i.e., first extended portion (804) and second extended portion (806)) will grip the cork (202) before the first arm (218) and the second arm (702) are blocked from further radially inward movement by the collar (136). In other words, the first arm (218) and the second arm (702) will not bump up against the edges of the collar (136) before the first extended portion (804) and the second extended portion (806) of the pair of paddles grip the cork (202).

Figure 9:
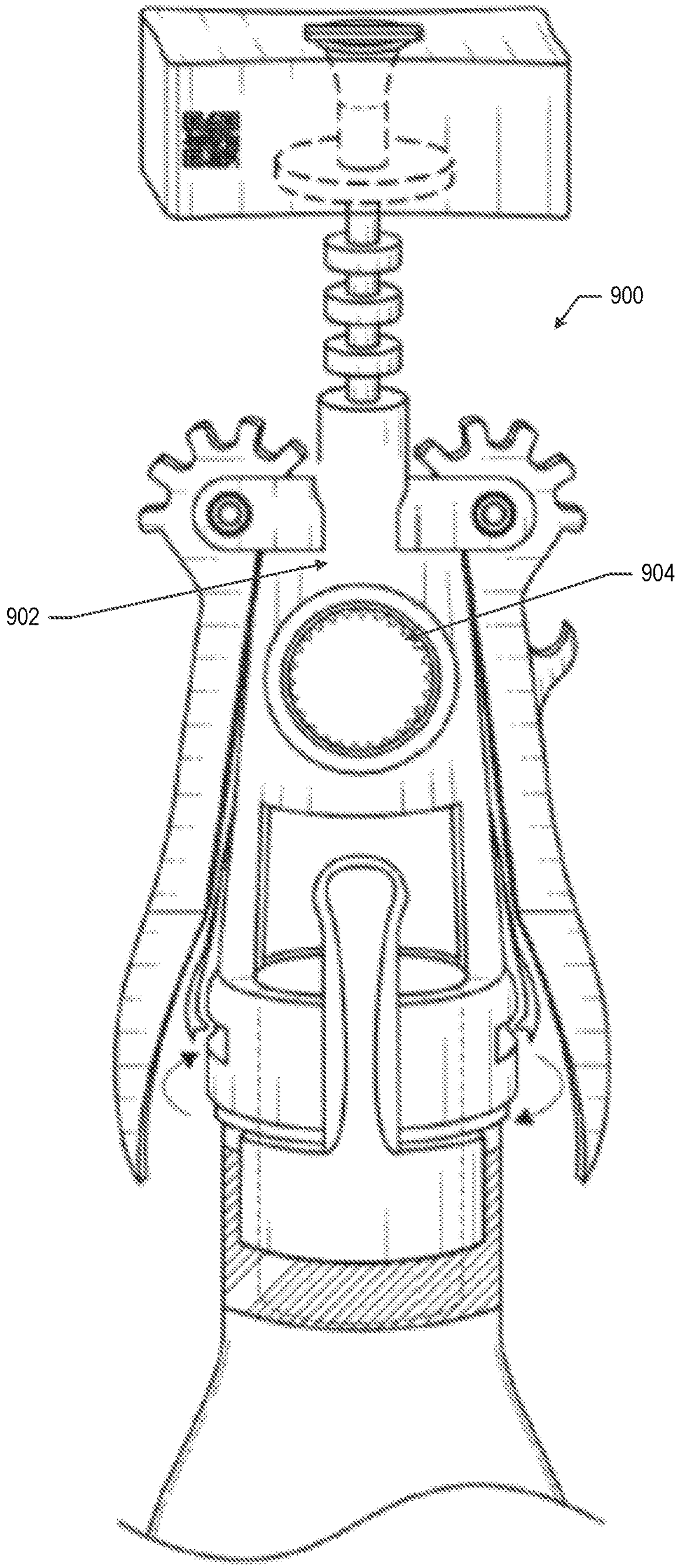

FIG. 9 through FIG. 12 show alternative embodiments to the corkscrew (100) shown in FIG. 1 through FIG. 8. The corkscrew (900) of FIG. 9 shows that the housing (902) has been expanded to occupy a greater contiguous area than the cross-brace (122), the first brace (132), and the second brace (134) as shown in FIG. 1. In this case, a circular gripping ridge (904) may be disposed in the housing (902). The circular gripping ridge (904) may be used as a bottle or can opener, such as when a bottle or can has a crimped lid or a twist-lid covering a bottle top or can top.

Figure 10:
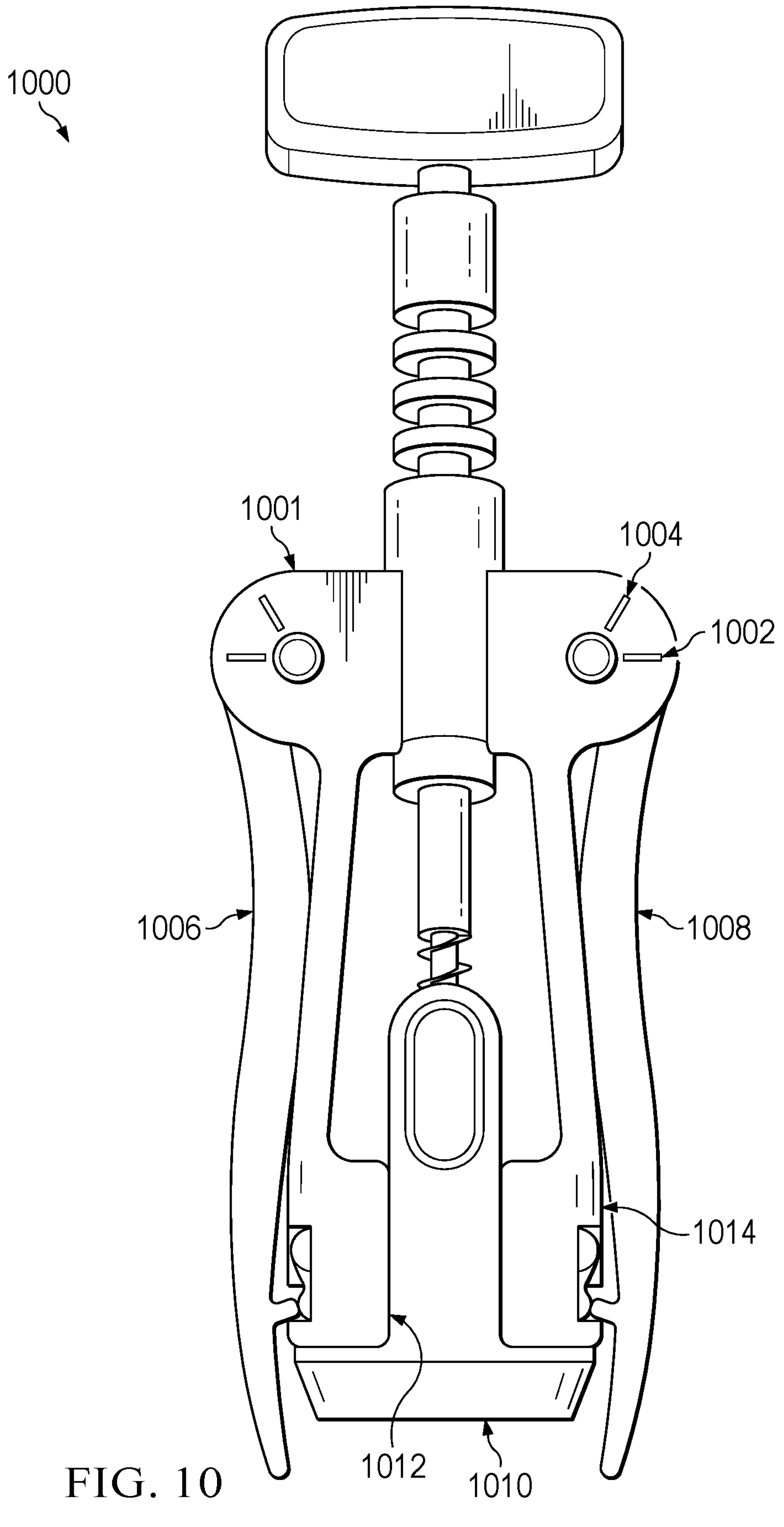
FIG. 10, FIG. 11, and FIG. 12 show another example of a corkscrew with a cork integrity protection apparatus, in accordance with one or more embodiments.
Figure 11:
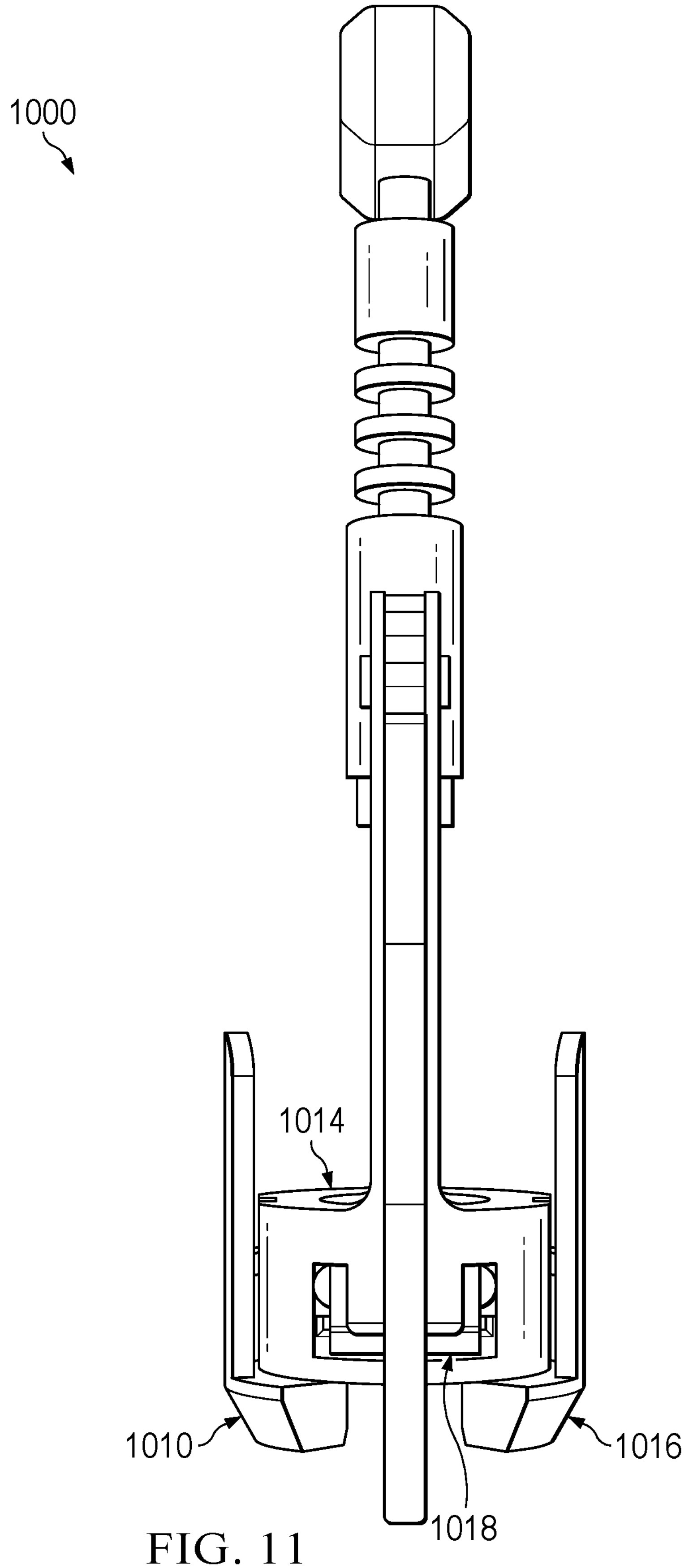
Figure 12:
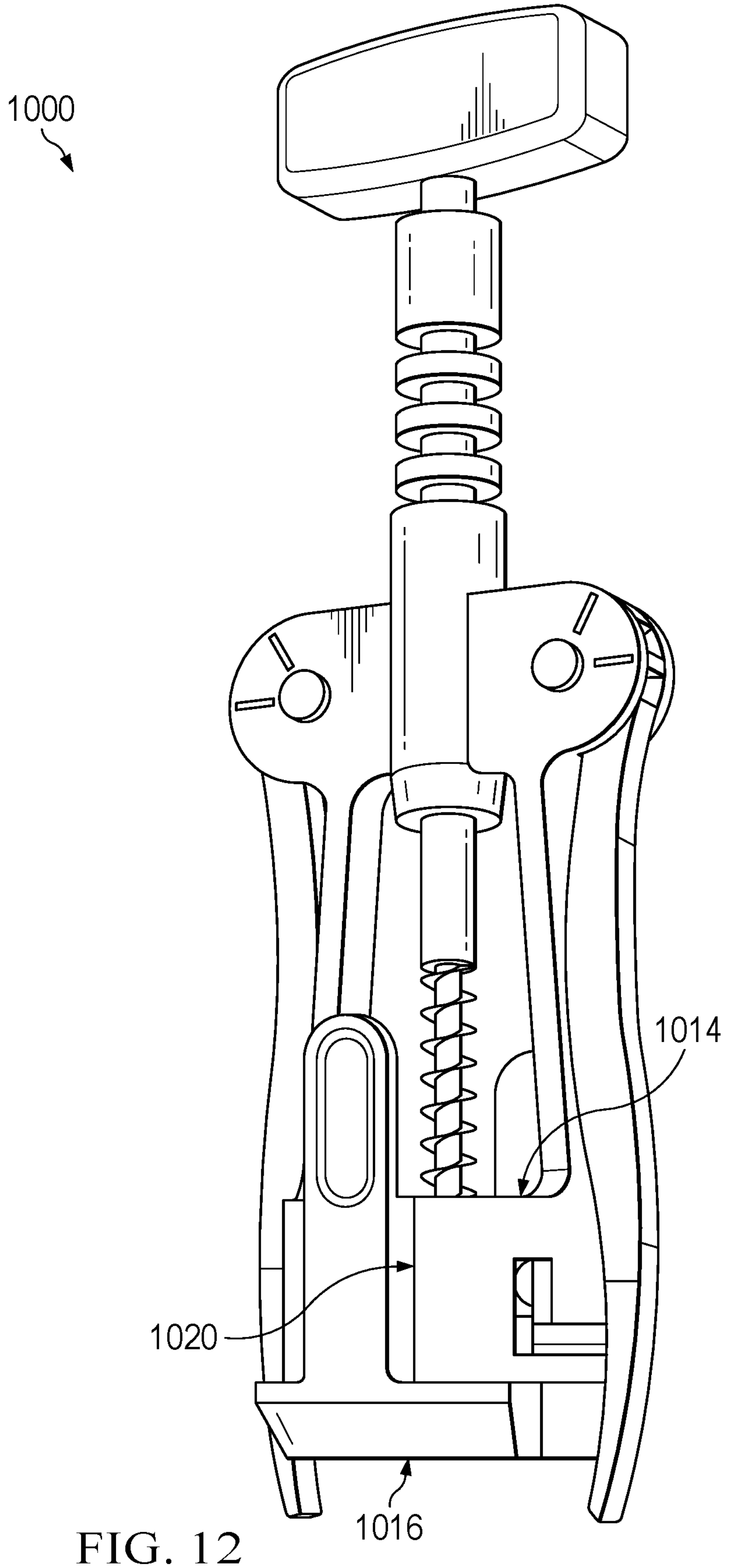

FIG. 10 through FIG. 12 show alternative dimensions, sizes, and shapes of the corkscrew (100) shown in FIG. 1 through FIG. 9. For example, referring to FIG. 10, the corkscrew (1000) includes multiple depth penetration markers embossed or engraved on the housing (1001), including shallow marker (1002) and deeper marker (1004). In this example, the user gauges the approximate level of the first wing (1006) and the second wing (1008) until the wings about line up with the corresponding marker. The user may select which depth penetration marker should align with the wings during use of the corkscrew (1000).

In addition, still referring to FIG. 10, the pair of paddles (the first paddle (1010) is shown in FIG. 10) are disposed in slots of the collar (1014) (the first slot (1012) is shown in FIG. 10). Unlike the example shown in FIG. 2 through FIG. 9, the pair of paddles are attached to the collar (1014), as opposed to being attached to the housing (1001).

FIG. 11 and FIG. 12 show the corkscrew (1000) of FIG. 10 from different perspectives. FIG. 11 shows a side view, which shows both the first paddle (1010) as well as the second paddle (1016). Additionally, the foil cutter (1018) is fully disposed in the collar (1014). In this case, the foil cutter (1018) takes the form of a hinged lever which is urged radially outwardly via a torsional spring or by a memory material. When the user presses the wings against the lever, the lever is pressed radially inwardly, thereby engaging the foil cutter (1018) against the foil disposed around a bottle, as described above.

FIG. 12 shows a side perspective view of the corkscrew (1000). In the view of FIG. 12, the second slot (1020) in the collar (1014) is shown. The second paddle (1016) sits in the second slot.

Additional descriptive text is now presented with respect to the corkscrew with cork integrity protection apparatus as shown in FIG. 1 through FIG. 12. The one or more embodiments shown in FIG. 1 through FIG. 12 may be described as a "CorkLift."

The CorkLift includes paddles, as described above and as shown in FIG. 1 through FIG. 12. The paddles hinge (or are integrally formed with a housing and formed to urge the bottom of the paddles radially inwardly towards the shaft) just above the base housing of the corkscrew, creating the step paddle. The initial feature of the paddles act as a centering device whereas the recoil of the paddles self-centers the CorkLift onto the top of the wine bottle. This feature allows for greater ease of holding the CorkLift centered on the top of the bottle in preparation of using (optional) a built-in foil cutter. The wings of the CorkLift are then compressed, which will engage the foil cutting blades into the side of the wine bottle's mouth. Simply spin the bottle two to three revolutions while squeezing the wings to cut the foil.

Next, drive the helix into the cork about 35 mm to about 40 mm, indicated by the helix depth indicators on the CorkLift. Optionally, a stop may prevent the screw shaft helix from penetrating past about 40 mm.

Initially, the helix is inserted into the cork. As the helix is driven into the cork, the wings will partially raise up. Once the helix is inserted centrally into the cork, the wings thereafter are pressed all the way down extracting the cork partially out of the bottle. The wings are then raised again to slide the step paddles up past the lip of the bottle. The paddles then are engaged against or near the cork, by virtue of the fact that they are being urged radially inwardly via hinges or the flexing of the housing. The paddles need not be urged towards the cork in some embodiments. However, the bottoms of the paddles are engaged against the top of the bottle in order to leverage lifting of the cork out of the bottle.

Stated differently, the wings may be raised again till the paddles snap into place around the exposed cork (above the top of the bottle and below the corkscrew housing). The paddles then rest against the top of the bottle, providing another reinforcing step that can push against bottle as more of the cork (or the rest of the cork) is extracted. At this point, the wings may be compressed downwardly a second time in order to extract the cork fully in a linear fashion, with no twisting or pulling.

Figure 13:
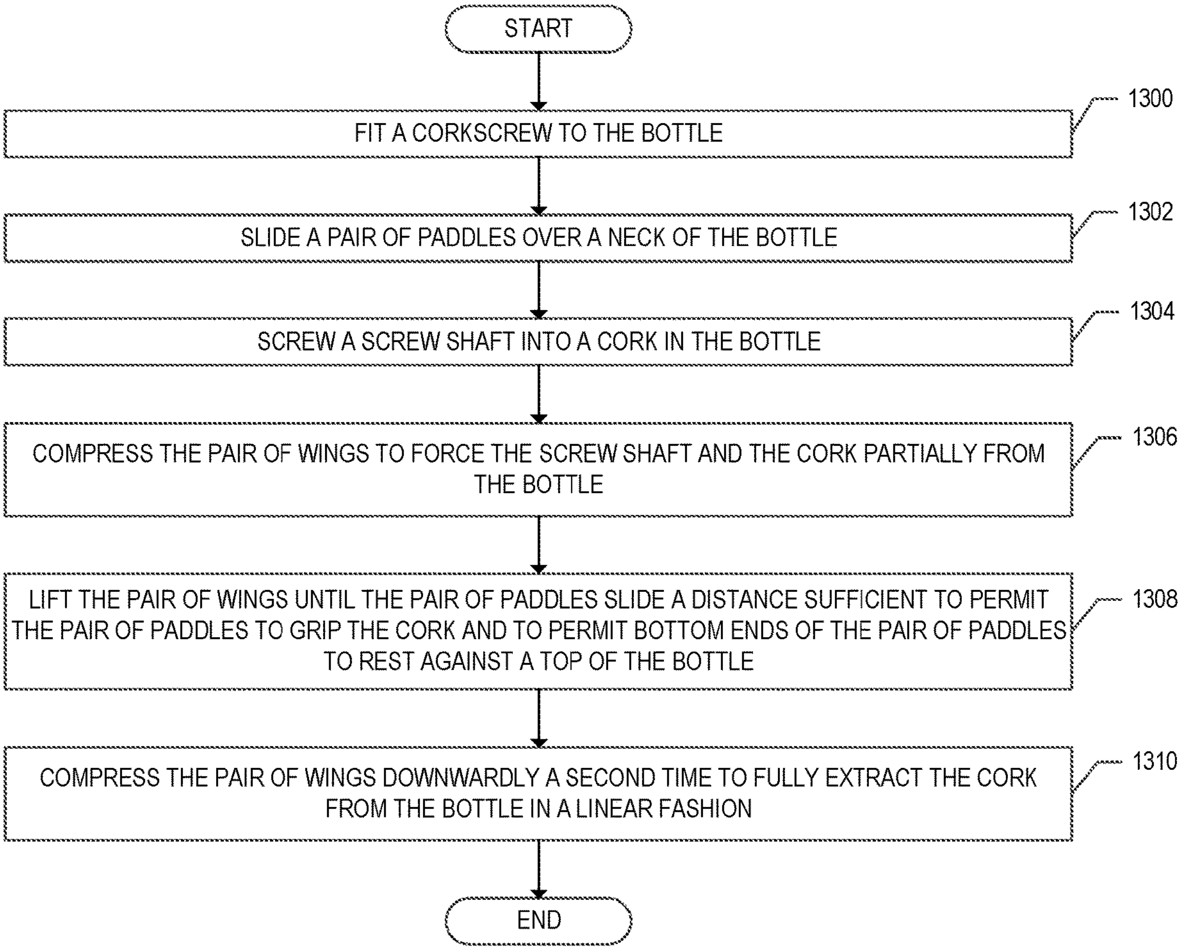
FIG. 13 shows a method of using a corkscrew with cork integrity protection apparatus, in accordance with one or more embodiments.

FIG. 13 shows a method of removing a cork from a bottle. The method of FIG. 13 may be performed using the corkscrew embodiments described with respect to FIG. 1 through FIG. 12.

Step 1300 includes fitting a corkscrew to the bottle. For example, the collar of the corkscrew may be placed over and around the bottle. The trocar remains at or above the cork, or may slightly penetrate the cork (e.g., about 2 mm or less).

Step 1302 includes sliding a pair of paddles over a neck of the bottle. For example, a user may open the pair of paddles radially outwardly, and then slide the pair of paddles over the neck of the bottle. The user then may permit the pair of paddles to move radially inwardly to press against the neck of the bottle. Note that step 1302 may be performed concurrently with step 1300 in some embodiments.

Step 1304 includes screwing the screw shaft into the cork. As described with respect to FIG. 1 through FIG. 9, turning and pressing the handle drives the trocar and the screw shaft into the cork. The wings elevate a first time as the screw shaft is driven into the cork by the twisting of the handle.

Step 1306 includes compressing the pair of wings to force the screw shaft and the cork partially from the bottle. The degree of compression may be determined by the user. Compressing the pair of wings forces the screw shaft upwardly. Because the cork is connected to the screw shaft by reason of the helical ridge around the screw shaft, the cork begins to lift out of the bottle. At this point the paddles continue to brace the bottle and remain urged up against the side of the neck of the bottle. Note that compressing the pair of wings at step 1306 may be considered compressing the pair of wings a first time.

Note also that, during step 1306, for the purposes of the one or more embodiments, it is immaterial whether the cork is considered as being removed from the bottle, or the bottle is considered as being removed from the cork. However, the cork body is moving proximally along a longitudinal axis of the corkscrew into the housing of the corkscrew, and is at least partially removed from the bottle.

Step 1308 includes lifting the pair of wings until the pair of paddles slide a distance sufficient to permit the pair of paddles to grip the cork and to permit bottom ends of the pair of paddles to rest against a top of the bottle. Thus, step 1308 includes manually raising the pair of wings a second time until the pair of paddles slide up the neck of the bottle, slip past the lip of the bottle, and subsequently push against the exposed cork while bottoms of the pair of paddles rest against the top of the bottle.

Stated differently, because the pair of paddles are urged radially inwardly by a spring or by the initial position of a memory material, the pair of paddles will grip the cork when a sufficient amount of the cork is exposed between the bottom of the collar and the top of the bottle. Furthermore, as indicated above, once the pair of paddles snap into place, the bottoms of the pair of paddles will rest against the top of the bottle opening. As a result, at this stage of cork extraction, a reinforcing braced relationship exists between the bottoms of the pair of paddles and the top of the bottle. For both reasons (i.e., because the cork is gripped and because of the braced relationship between the pair of paddles and the top of the bottle), the pair of paddles help to maintain cork integrity as the cork is lifted and eventually removed from the bottle.

Step 1310 includes compressing the pair of wings downwardly a second time to fully extract the cork from the bottle in a linear fashion. Step 1310 may be considered optional in some embodiments. For example, the user may desire to only partially extract the cork in some cases until the user is ready to fully extract the cork. In other cases, the cork may be longer than normal, in which case an additional lift operation may be desirable to fully remove the cork (i.e., by further pulling on the corkscrew and/or the bottle, by repositioning the paddles a third time and performing another lift operation, etc.). Note that the corkscrew of the one or more embodiments may include multiple, stacked, or stepped paddles in order to accommodate multiple CorkLift operations. In this case, each time the cork is partially lifted, the bottoms of another set of the multiple, stacked, or stepped paddles may engage the top of the bottle to further secure the cork during a CorkLift operation.

The method of FIG. 13 may be varied. For example, the one or more embodiments also provide for a method of opening a bottle stoppered with a cork. The method includes fitting a corkscrew with cork integrity protection apparatus, as described above, to the bottle. The method also includes screwing the helix portion of the screw shaft into the cork. The method also includes compressing the pair of wings to partially lift the cork from the bottle. The wings may then be raised upwardly, causing the step paddles to slide up the cylindrical outer wall of the bottle near the top of the bottle. Because the paddles are urged radially inwardly towards the bottle, once the paddles slide up and clear the lip of the bottle, the sides of the paddles will snap or move inwardly against or near the exposed cork. This action will reset the foundational throw of the cork extraction apparatus.

In an embodiment, the pair of step paddles that are attached to the corkscrew housing may transition from a self-centering, self-holding function by way of lifting the wings up after the initial press (partial cork extraction). This procedure will slide the step paddles up and, eventually, over the top of the bottle. Upon passing the top edge of the mouth of the wine bottle, the step paddles will snap into place around the exposed cork. The bottom of the paddles rest against the top of the bottle. This function may act as an auxiliary step or buttress, allowing the second press of the wings to fully extract the remaining captured cork.

The CorkLift technique may be described alternatively as follows. First, pinch the step paddles to open the mouth of the CorkLift, spreading the paddles apart. Second, place the CorkLift corkscrew over the top of the wine bottle and release the paddles. The paddles will engage around the upper neck of the bottle and self-center the CorkLift and helix.

Third, squeeze the corkscrew wings to engage the built-in foil cutter, driving the blades into the side of the foil/bottle. Spin the bottle while compressing the wings to cut the foil. Remove foil coin or leave for later removal.

Fourth, drive the helix/worm into the cork (about 35 mm to about 40 mm), as indicated by the helix depth gauge marking near the wing axles. Fifth, conduct the initial press of the wings to partially extract the cork.

Sixth, raise the wings a second time until the paddles clear the top of the bottle and snap around or near the exposed cork, establishing a new functional base. Seventh, press the wings down the second time to fully extract the cork.

Eighth, remove the cork from the helix by lightly compressing the outside of the paddles and reversing the handle. The cork will be delivered out of the housing of the CorkLift.

Figure 14:
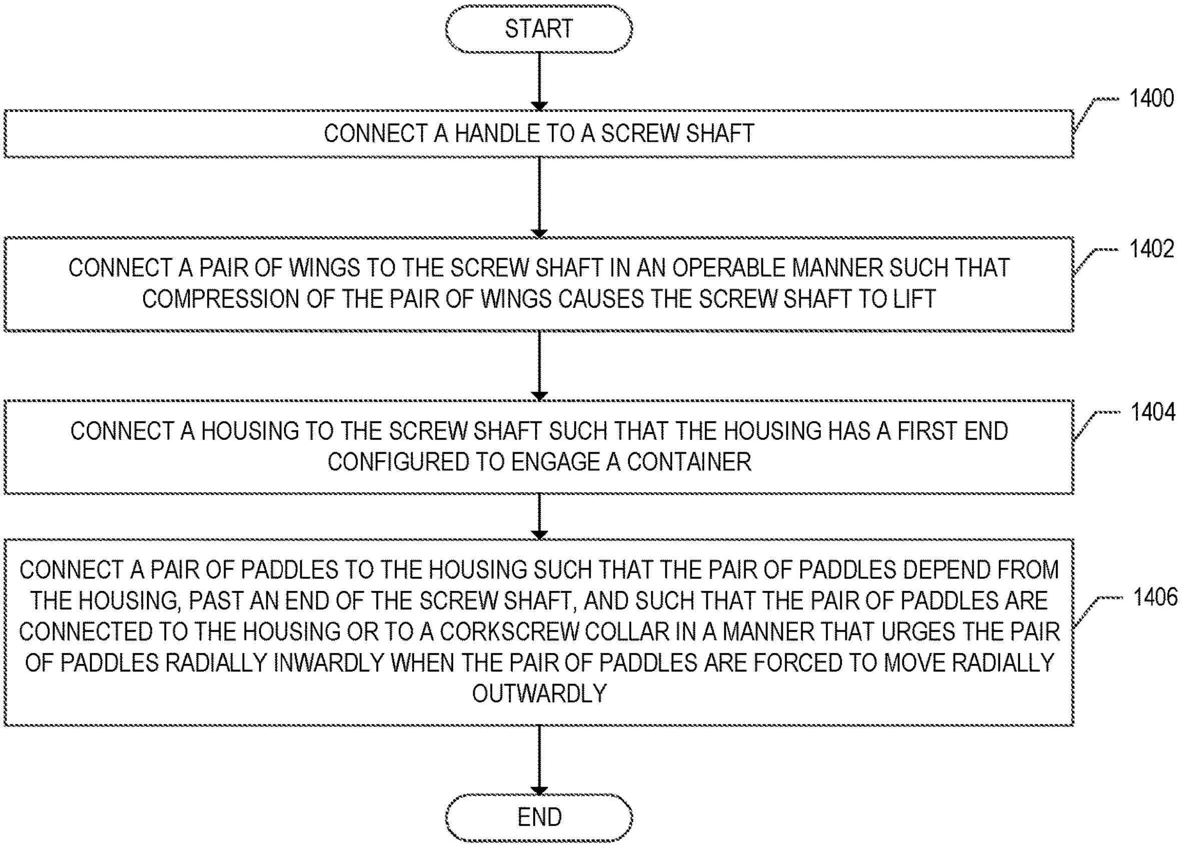
FIG. 14 shows a method of manufacturing a corkscrew with cork integrity protection apparatus, in accordance with one or more embodiments.

FIG. 14 is method of manufacturing a corkscrew. The method of FIG. 14 may be used to manufacture the corkscrew shown in any of FIG. 1 through FIG. 12.

Step 1400 includes connecting a handle to a screw shaft. Connecting may be performed by gluing, welding, fastening.

Step 1402 includes connecting a pair of wings to the screw shaft in an operable manner such that compression of the pair of wings causes the screw shaft to lift. The pair of wings may be disposed opposite each other relative to the screw shaft. The operable manner may be accomplished by using gear teeth disposed on the pair of wings, which interact with gear steps disposed on the screw shaft. The operable manner also may be accomplished by other means, such as by using an electric or hydraulic actuator, etc.

Step 1404 includes connecting a housing to the screw shaft such that the housing has a first end configured to engage a container. Thus, for example, the housing may be secured closer to one end of the screw shaft, leaving the other end of the screw shaft able to engage a container without the container striking the housing. The first end may be configured to engage a container by means of a trocar or some other end effector.

Step 1406 includes connecting a pair of paddles to the housing such that the pair of paddles depend from the housing, past an end of the screw shaft, and such that the pair of paddles are connected to the housing or to a corkscrew collar in a manner that urges the pair of paddles radially inwardly when the pair of paddles are forced to move radially outwardly.

For example, the pair of paddles may be attached to the housing via a torsional spring, or may be integrally formed with the housing, as shown in FIG. 1 through FIG. 9. In the latter case, the pair of paddles may be made from a memory material that seeks to retain its original shape when displaced from its initial position. In another example, the pair of paddles may be connected to the collar of the corkscrew in like manner, as shown in FIG. 10 through FIG. 12.

The method of FIG. 14 may be varied. For example, a manufacturing method may further include forming the first end as a collar. The manufacturing method may further include connecting a bottle opener to at least one of the pair of wings. The manufacturing method may further include connecting at least one set of ridges to at least one of the housing or at least one of the pair of wings. The manufacturing method may further include disposing a static marker on the housing and further disposing a mobile marker on at least one of the wings. The wings may be fitted with flanges or tabs (i.e., a "tab lift") that can be used to assist with opening a can of soda, for example. The manufacturing method may include combinations of the above variations.

The term "about," when used with respect to a physical property that may be measured, refers to an engineering tolerance anticipated or determined by an engineer or manufacturing technician of ordinary skill in the art. The exact quantified degree of an engineering tolerance depends on the product being produced and the technical property being measured. For a non-limiting example, two angles may be "about congruent" if the values of the two angles are within ten percent of each other. However, if an engineer determines that the engineering tolerance for a particular product should be tighter, then "about congruent" could be two angles having values that are within one percent of each other. Likewise, engineering tolerances could be loosened in other embodiments, such that "about congruent" angles have values within twenty percent of each other. In any case, the ordinary artisan is capable of assessing what is an acceptable engineering tolerance for a particular product, and thus is capable of assessing how to determine the variance of measurement contemplated by the term "about."

As used herein, the term "connected to" contemplates at least two meanings. In a first meaning, unless otherwise stated, "connected to" means that component A was, at least at some point, separate from component B, but then was later joined to component B in either a fixed or a removably attached arrangement. In a second meaning, unless otherwise stated, "connected to" means that component A could have been integrally formed with component B. Thus, for example, assume a bottom of a pan is "connected to" a wall of the pan. The term "connected to" may be interpreted as the bottom and the wall being separate components that are snapped together, welded, or are otherwise fixedly or removably attached to each other. Additionally, the term "connected to" also may be interpreted as the bottom and the wall being contiguously together as a monocoque body formed by, for example, a molding process. In other words, the bottom and the wall, in being "connected to" each other, could be separate components that are brought together and joined, or may be a single piece of material that is bent at an angle so that the bottom panel and the wall panel are identifiable parts of the single piece of material.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

While the invention has been described with respect to a limited number of embodiments, those skilled in the art, having benefit of this disclosure, will appreciate that other embodiments can be devised which do not depart from the scope, as disclosed herein. Accordingly, the scope should be limited only by the attached claims.

What is claimed is:

1. A method of opening a bottle having a lip and stoppered with a cork, the method comprising the steps of:

fitting a corkscrew to the bottle, the corkscrew comprising:

a handle;

a screw shaft connected to the handle;

a pair of wings configured to lift the screw shaft when the pair of wings is compressed, and configured to drive the screw shaft downwardly relative to a housing when the pair of wings is raised, wherein the pair of wings are disposed opposite each other relative to the screw shaft;

the housing connected to the screw shaft, and having a lowermost first end configured to engage an outer surface of the lip of the bottle;

a pair of paddles connected to and depending from the housing, and extending downwardly past the lowermost first end of the housing, wherein the pair of paddles is connected to the housing in a manner so as to urge lower portions of the pair of paddles to move radially inwardly upper portions of the pair of paddles are urged to move radially outwardly;

applying an external, radially-inward force to the upper portions of the pair of paddles to urge the lower portions of the pair of paddles radially outward, thereby enabling the lower portions of the pair of paddles to be seated on the lip of the bottle, and the lowermost first end of the housing to seat over an outside surface of the lip of the bottle, and thereby causing the housing to be self-centering and self-holding on the bottle, while stabilizing the housing during subsequent screw shaft rotation;

screwing the screw shaft into the cork, thereby raising the pair of wings;

compressing the pair of wings to force the screw shaft upwardly and the cork partially from the bottle; and raising the pair of wings until the lower portions of the pair of paddles slide upwardly along an outer neck of the bottle a distance, relative to the screw shaft and to the cork, sufficient to permit bottommost ends of the pair of paddles to be raised above a topmost edge of the lip of the bottle.

2. The method of claim 1, further comprising: the step of compressing the pair of wings downwardly a second time to fully extract the cork from the bottle.

3. The method of claim 1, wherein immediately after the step of raising the pair of wings until the pair of paddles slide an upward distance, the lower portion of the paddles contacts a portion of the cork.

4. The method of claim 1, further comprising a spring associated with the pair of paddles to normally urge the lower portion of the paddles radially inwardly.

5. The method of claim 1, wherein during the step of screwing the screw shaft into the cork, the pair of wings are raised into a generally Y-shaped position.

6. The method of claim 5, wherein when the wings are in the generally Y-shaped position, an upper portion of the wings is at about a level of the handle.

7. The method of claim 1, wherein the pair of paddles are radially offset from, and in non-interfering motion with, the pair of wings.

* * * * *